Patented Mar. 7, 1950

2,499,561

UNITED STATES PATENT OFFICE 2,499,561

PRODUCTION OF AROMATIC HALOSILANES

Arthur J. Barry, Midland, Mich., assignor to Dow Corning Corporation, Midland, Mich., a corporation of Michigan No Drawing. Application February 23, 1949, Serial No. 77,998

7 Claims. (Cl. 260—448.2)

This invention relates to the manufacture of aromatic halosilanes. It is particularly concerned with an improved process for the preparation of diorganochlorosilanes in which an organic radical attached to silicon contains chlorine bonded to carbon in an aromatic ring.

Chlorobenzene and methyldichlorosilane may be interacted under condensed phase conditions at temperatures of from 250° C. to 460° C. to produce phenylmethyldichlorosilane, as has been shown in my copending application Serial Number 773,926, filed jointly with De Pree and Hook. In this process, the chlorine attached to a benzene ring is highly reactive towards the silane.

The present invention has for an object the preparation of diorganochlorosilanes in which an organic radical contains chlorine attached to carbon in an aromatic ring. Another object is to provide a method whereby chlorobenzene may be reacted with methyldichlorosilane without displacement of the chlorine from the aromatic ring structure.

In accordance with the present invention, an aromatic halohydrocarbon is reacted with a monoorganodichlorosilane in the presence of boron or aluminum chloride. The reaction is effected at a temperature of from 150° to 310° C. under sufficient pressure that at least a portion of the reaction mixture is in liquid phase. Under these conditions, organodichlorosilyl derivatives of the chlorohydrocarbon are produced in good yield.

Monoorganodichlorosilanes with which the invention is concerned are compounds of the formula RHSiCl$_2$, in which R represents a monovalent hydrocarbon radical. Examples of suitable silane reactants are methyldichlorosilane, CH$_3$SiHCl$_2$, and phenyldichlorosilane,

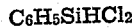

Suitable aromatic halohydrocarbons include chlorobenzene, dichlorobenzene and chlorobiphenyl.

The proportion of halohydrocarbon to silane may be varied over a wide range. Preferably, however, the mixture contains less than 20 mols of either reactant per mol of the other. From a practical standpoint, particularly good results are obtained when the reaction mixture contains approximately equimolecular proportions of halohydrocarbon and organodichlorosilane.

The boron or aluminum chloride may be added as such, or it may be produced in situ by the addition of materials such as boron fluoride, boron oxide and aluminum oxide. The boron or aluminum chloride is employed in a proportion of at least 0.1 percent and generally less than 5 percent, based on the total weight of the reactants. Larger proportions may be employed if desired. Boron chloride is readily separable from the reaction product due to its low boiling point. Aluminum chloride has a higher boiling point and may be separated from the reaction products by distillation. When a higher proportion of condensed materials which contain two silicon atoms bonded to a single aryl nucleus is desired, aluminum chloride may be employed. This product may be stripped of unreacted materials, and hydrolyzed either alone or in mixture with other chlorosilanes. The aluminum chloride will be removed from the siloxane by washing.

The reaction may be carried out in any equipment conventionally employed for pressure reactions. A convenient method is to charge a sufficient volume of the reactants into a pressure autoclave that there will remain a liquid phase when the autoclave is heated at from 150° to 310° C. Alternatively, the reaction may be effected under pressure in a continuous tube furnace.

Operating in the manner described, the reaction proceeds with the formation of an aromatic chlorosilane which contains hydrolyzable chlorine attached to a silicon atom, an aromatic ring bonded to the same silicon atom through a carbon to silicon linkage, and a chlorine atom attached to a carbon atom in said ring.

Example 1

2025 grams chlorobenzene, 2070 grams methyldichlorosilane and 47 grams boron chloride were introduced into a pressure autoclave of 14.4 liters capacity. The autoclave was then heated to a temperature of 166° C. for 16 hours. A maximum pressure of 120 pounds was attained. The contents of the autoclave were discharged and distilled. A yield of 250 grams chlorophenylmethyldichlorosilane, ClC$_6$H$_4$(CH$_3$)SiCl$_2$, was thereby obtained. It is a colorless liquid at ordinary temperatures, having a density of 1.28–1.294, and distilling at 128°–129° C. at 30 millimeters absolute pressure.

Example 2

A 14.4 liter autoclave was charged with 2025 grams chlorobenzene, 2070 grams methyldichlorosilane and 42 grams boron chloride. The autoclave was then heated at 218° C. for 16 hours. A maximum pressure of 450 pounds per square inch was attained. The contents of the autoclave were discharged and distilled. There was thereby obtained 877 grams chlorophenylmethyldichlorosilane, 677 grams methylchlorosilanes and 201 grams of distillation residue which contained bis-(methyldichlorosilyl) chlorobenzene, $$(CH_3Cl_2Si)_2C_6H_3Cl$$

This compound is of utility in the preparation of siloxanes.

Example 3

When Example 2 is repeated substituting aluminum chloride for boron chloride similar results are obtained but with a larger proportionate yield of the higher boiling materials.

Example 4

The pressure autoclave described in Example 2 was charged again with the same amounts of chlorobenzene, methyldichlorosilane and boron chloride. The autoclave was then heated at 305° C. for 16 hours. A maximum pressure of 850 pounds per square inch was attained. The contents of the autoclave were discharged and distilled. 271 grams chlorophenylmethyldichlorosilane, 122 grams chlorophenyltrichlorosilane, and 319 grams of material which contained hydrolyzable chlorosilanes having chlorophenyl groups attached to silicon were obtained.

Example 5

A fifty gallon autoclave was charged with 87 pounds chlorobenzene, 44 pounds methyldichlorosilane and 1.3 pounds boron chloride. The autoclave was heated at 200° C. for 16 hours. A maximum pressure of 350 pounds per square inch was attained. Distillation of the reaction product yielded 27 pounds chlorophenylmethyldichlorosilane and 9.3 pounds of methyltrichlorosilane.

Example 6

441 grams orthodichlorobenzene, 345 grams methyldichlorosilane and 14 grams boron chloride were introduced into a pressure autoclave of 2.4 liters capacity. The autoclave was then heated at 181° C. for 16 hours. The contents of the autoclave were discharged and distilled. As a fraction distilling at from 145° to 151° C. at 30 millimeters pressure, dichlorophenylmethyldichlorosilane, $Cl_2C_6H_3(CH_3)SiCl_2$, was obtained.

Example 7

When 566 grams chlorobiphenyl, 355 grams methyldichlorosilane and 9 grams boron chloride are charged into a 2.4 liter autoclave and heated at 200° C. for 16 hours chlorobiphenylylmethyldichlorosilane, $ClC_{12}H_8(CH_3)SiCl_2$, is produced. This compound is of utility in the preparation of siloxanes.

Example 8

When a 2.4 liter autoclave is charged with 337.5 grams chlorobenzene, 531 grams phenyldichlorosilane and 8.7 grams boron chloride and the autoclave is heated at 260° to 270° C. for 16 hours chlorophenylphenyldichlorosilane is produced.

In each of the foregoing examples, unreacted chlorohydrocarbon and organodichlorosilane may be recovered.

That which is claimed is:

1. The method which comprises reacting an aromatic chlorohydrocarbon containing nuclearly substituted chlorine with a monoorganodichlorosilane of the formula $RHSiCl_2$, in which R represents a monovalent hydrocarbon radical free of aliphatic unsaturation, in the presence of a chloride of the group consisting of boron and aluminum chlorides at a temperature of from 150° to 310° C. at least a portion of the reaction mixture being in liquid phase, whereby to produce an organodichlorosilyl derivative of said chlorohydrocarbon with the silicon bonded directly to the aromatic ring thereof.

2. The method which comprises reacting an aromatic chlorohydrocarbon containing nuclearly substituted chlorine with a monoorganodichlorosilane of the formula $RHSiCl_2$, in which R represents a monovalent hydrocarbon radical free of aliphatic unsaturation, in the presence of boron chloride in amount corresponding to from 0.1 to 5.0 percent by weight based on the total weight of reactants at a temperature of from 150° to 310° C., at least a portion of the reaction mixture being in liquid phase, whereby to produce an organodichlorosilyl derivative of said chlorohydrocarbon with the silicon bonded directly to the aromatic ring thereof.

3. The method in accordance with claim 2 in which the silane reactant is methyldichlorosilane.

4. The method in accordance with claim 2 in which the chlorohydrocarbon is chlorobenzene.

5. The method in accordance with claim 2 in which the chlorohydrocarbon is dichlorobenzene.

6. The method in accordance with claim 2 in which the chlorohydrocarbon is chlorobiphenyl.

7. Bis(methyldichlorosilyl) chlorobenzene.

ARTHUR J. BARRY.

REFERENCES CITED

The following references are of record in the file of this patent:

UNITED STATES PATENTS

| Number | Name | Date |
|---|---|---|
| 2,379,821 | Miller | July 3, 1945 |
| 2,405,019 | Dalin | July 30, 1946 |
| 2,407,181 | Scott | Sept. 3, 1946 |
| 2,469,355 | De Pree | May 10, 1949 |